Oct. 21, 1958 H. L. NOBLITT 2,857,051
METHOD OF RECOVERING WHITE MICA
Filed April 26, 1956
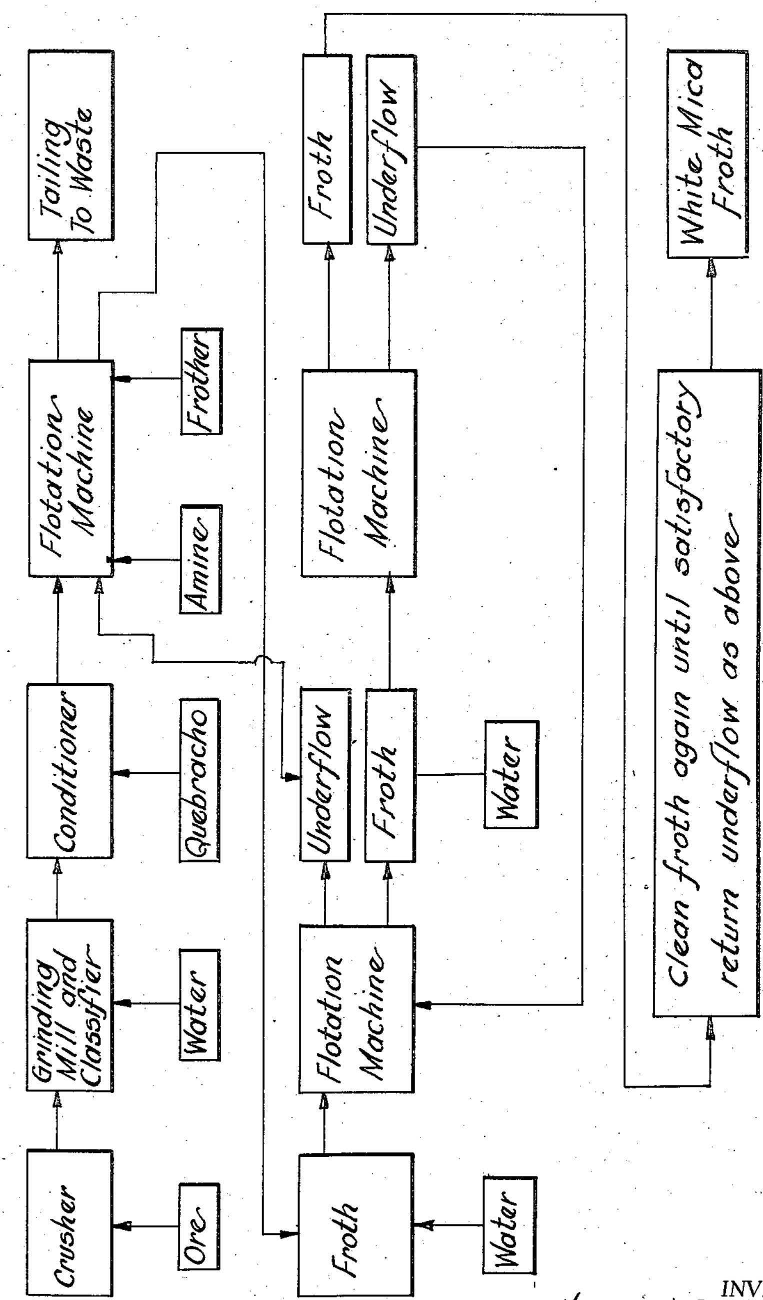
INVENTOR
Harvey L. Noblitt
BY Alex. E. MacRae
ATTORNEY

United States Patent Office 2,857,051

Patented Oct. 21, 1958

1

2,857,051

METHOD OF RECOVERING WHITE MICA

Harvey L. Noblitt, Ottawa, Ontario, Canada

Application April 26, 1956, Serial No. 580,732

8 Claims. (Cl. 209—167)

This invention relates to the recovery of white mica and more particularly to a new method of separating white mica from granular silicates and oxides and from black mica.

Heretofore no satisfactory commercial method has been found for the separation of white mica from black mica or from ores containing some black mica. White mica in smaller than scrap sizes has been recoverable only from ores in which no black mica occurred.

There are many commercial uses for white mica. When finely ground (90 to 100%—325 mesh) it is a valuable constituent of paints, improving the covering power and adding sheen to the coated surface. In larger-sized flakes (20 mesh) it is finely delaminated and may be made into a sheet or ribbon. This ribbon or sheet, when impregnated with a suitable bonding medium, produces an electrical insulating material that is as good as natural sheet mica splittings and is much less expensive. White mica is also useful in the rubber and plastic industry and in wall-paper production.

The object of this invention is to provide a satisfactory commercial method of separating white mica from black mica and separating white mica from ores containing both types of mica.

The most common species of white mica is muscovite, the ideal formula of which is $2H_2O.K_2O.3Al_2O_3.6SiO_2$ (silica 45.2%, alumina 38.5%, potash 11.8%, and water 4.5%). The alumina may be replaced by ferric oxide and the potash by ferric oxide, soda or lithia.

In developing the method of the present invention experiments were carried out on an ore containing white mica having the following analysis: silica 42.68%, iron reported as $Fe_2O_3$ 2.19%, alumina 36.01%, lime nil, magnesia 0.46%, soda 0.57%, potash 10.06%, lithia 0.22%, others (largely water) 7.8%. The remainder of the ore consisted of feldspar, nephelite, calcite, corundum, sulphides, scapolite and some cancrinite. There was no quartz present in the ore. In addition to the above the ore contained from 15 to 35% black mica having the following analysis: 8.26% potash, 1.43% soda, 4.97% magnesia, 24.8% alumina and 18.45% iron present in both ferric and ferrous forms.

The accompanying flow sheet illustrates the method of the present invention.

In accordance with the invention the ore containing both white and black mica is crushed and then ground in water to pass a screen having at least 20 meshes to the inch. Finer grinding is preferable provided that no detrimental effects are produced on the concentration of other minerals, if any, that are to be recovered. If there are sulphides present in the ore they should be removed during the grind operation. This may be effected by adding to the crushing circuit a suitable quantity of reagent such as pentasol amyl xanthate. The discharge from the crushing circuit is passed through a flotation cell to which a frother is added. The sulphides are collected in the froth. The resulting discharged pulp is conditioned by adding thereto from 0.1 to 1.0 pound per ton of ore of a tannin or tannic acid bearing material, such as quebracho extract, for a period of time up to 10 minutes in any suitable machine. This conditioning agent has a depressing effect on all iron-bearing minerals but is least effective on the white mica due to its low iron content. The density of the pulp at this stage may be that to be used in subsequent flotation treatment, usually from 20 to 30% of solids by weight.

It is important that the pH of the pulp be closely controlled to keep it in the range of 7.5 to 9.5. If the pH of the pulp is not within this range soda ash or the like in the required amount should be added. The conditioned pulp is then treated by adding thereto from 0.05 to 1.0 pound per ton of ore of an amine or a mixture of amines. The preferred amine mixture is one having 16 to 18 carbon atoms in the chain but those with from 14 to 20 carbon atoms in the chain are effective. Shorter chain amines are less selective. This treatment may be given in a separate conditioner prior to the flotation treatment or in the cells employed in such flotation treatment. In either case the pulp is introduced into a flotation machine to which is added from 0.05 to 1.0 pound per ton of ore of any suitable frother. Non-alcoholic frothers, such as cresylic acid, and in amounts of 0.05 to 0.6 pound per ton of ore are preferred.

The white mica collects in the froth leaving the other minerals in the flotation cells. Some of the other minerals may be carried over with the white mica. If this condition occurs the other minerals may be removed by diluting the froth with water (no additional reagents being added) and passing it through one or more cleaning flotation cells where the white mica floats in the froth and the other minerals, including the black mica, are left in the cells. This cleaning procedure is repeated until the white mica concentrate is sufficiently pure.

An excess of the amine reagent may cause other minerals, notably white granular silicates such as feldspar and nephelite, to become flocuulated or amine-coated and thus cause them to float with the white mica. This may be prevented by adding soda ash to the pulp as mentioned above to bring the alkalinity thereof to a pH of 7.5 to 9.5. Separation of white mica from white granular silicates by the use of amines is limited to alkaline pulps since with amines in acid pulps both minerals float.

Due to the relatively low solubilities in water of amines having 14 to 20 carbon atoms in the chain these reagents are more effective in warm water. Below 50° F. flotation of mica is poor but around 70° F. it is satisfactory. Higher temperatures are more effective but are much more expensive to maintain.

White mica flakes larger than those that can pass through a screen having 65 meshes to the inch are more difficult to float than the finer sizes unless the flakes are very thin.

The following examples are illustrative of the method:

*Example 1*

43.13 tons of nepheline syenite ore containing 0.07% sulphides, 3.44% corundum, 3.25% calcite, 13.57% black mica, 9.05% white mica and 70.62% combined feldspars, nephelite and scapolite was crushed to 3/8 inch and was ground in a rod mill with steel rods and water at about 60% solids by weight. Pentasol amyl xanthate was fed to the rod mill at a rate of about 0.23 pound per ton of ore. Rod mill discharge was screened on a screen having 50 meshes to the inch and the oversize was reground in a ball mill with 1-inch iron balls. Ball mill discharge was pumped back to the screen. Screen undersize was all minus 50-mesh.

A frother, for example, that known under the trade name "Aerofloat 31," which is a black liquid made by reacting cresol with 25% by weight of phosphoric pentasulphide saturated with and containing 6% of thiocarbanilid, was fed to the screen underflow which entered a flotation cell. In this cell the sulphides that had been collector-coated by the xanthate were floated in the froth provided by the "Aerofloat 31." The tailing from the sulphide flotation cell, combined with the tailing from the white mica cleaner cells, was pumped to a mechanically agitated conditioner. In this conditioner the pulp was agitated for about 10 minutes with quebracho extract in the amount of about 0.64 pound per ton of ore at about 20% solids by weight. The overflow from this conditioner was fed to the first of five flotation cells. To this cell the acetate of an amine having 16 to 18 carbons in its carbon chain and comprising a tallow sold under the trade name "Armac HT" was added at the rate of 0.68 pound per ton of ore. Also added to this cell was more "Aerofloat 31" to bring the total of the two additions to 0.52 pound per ton of ore. The pulp passed through this cell and four other cells in series with it in approximately 10 minutes. The white mica collected in the froth along with some black mica, some granular silicates and a small amount of corundum.

The froth from these five cells was pumped to the last of six smaller flotation cells after dilution with water. In this cell the white mica collected in the froth and most of the black mica, corundum and granular silicates were rejected as a tailing that joined the feed to the white mica conditioner. The froth from this last cell was fed to the fifth cell after dilution by a spray of water. Froth from the fifth cell was fed to the fourth cell and the tailing to the sixth cell. This was repeated with the other cells until pure white mica was collected from the first cell. Only a trace of sulphide and black mica remained in the concentrate. From the 43.13 tons 1957 pounds of white mica concentrate were made containing not more than 1 pound of sulphide and 2 pounds of black mica. The other 1954 pounds were pure white mica. The temperature of the pulp varied from 65 to 70° F. and the pH of the solution averaged 8.8. It was not necessary in this case to add any soda ash.

*Example 2*

A sample of a nepheline syenite ore containing 0.2 to 0.3% iron and copper sulphides, 3 to 10% white mica, 3 to 6% calcite, 1 to 5% corundum, 15 to 35% black mica and 55 to 80% granular white silicates was crushed to pass a screen having 4 meshes to the inch and was ground in a rod mill with water to which was added about 0.2 pound of pentasol amyl xanthate. The discharge from the mill was passed through a unit flotation cell where a small quantity of "Aerofloat 31" was added as frother. The sulphides were collected in the froth. The discharge of the unit cell was screened on a screen having 65 meshes to the inch. Oversize from the screen was returned to the rod mill for further grinding. The undersize from the screen, which contained only about 10% of solids by weight, was dewatered to about 25% solids by weight in a hydroseparator. The thickened pulp was conditioned for about 3 minutes in a conditioner to which was added about 0.17 pound of quebracho extract for each ton of ore. The overflow from this conditioner was fed to the first of 4 flotation cells with 0.19 pound of an acetate of a mixture of amines having 16 to 18 atoms of carbon per molecule ("Armac HT") and 0.12 pound of "Aerofloat 31" per ton of ore. During the three minutes it took the pulp to pass through the 4 cells the froth was collected. The froth was diluted with water and was fed to another flotation cell where the froth was again collected. This dilution and refloating of froth was done 6 times in all. The cleaned froth was run over a Wilfley table to remove a very little sulphide that had escaped the unit cells. The tailing from this table was dried and examined. Its weight was equal to 2.5% of the original ore and it contained no more than 0.1% of impurities. Flotation temperatures were 68 to 72° F. The pulp had a pH of 8.8. It was not necessary to use sufficient flotation reagent in this case to require the addition of soda ash.

After the initial grinding step described in the above examples and before the next step it is preferred to further grind the ore for a period of time in a rubber-lined rod mill loaded with rubber-covered rods. The action of the rubber-covered rods is to delaminate the mica without any substantial crushing of the other (nonplatey) minerals thus providing thiner flakes which float more readily.

*Example 3*

A sample of ore of the type used in Example 1 was subjected to the same treatment as in such example. Following the primary grinding step the ore was ground in a rubber-lined rod mill loaded with rubber-coated rods for ten minutes and the treatment continued as in Example 1. The resulting concentrate amounted to 85% of the available white mica in the feed.

*Example 4*

A further test was made as in Example 3 in which the grinding time in the rubber-lined mill was increased to twenty minutes. A small additional amount of "Armac HT" was used to insure sufficient of this reagent to coat the increased surface area of the mica flakes. No mica was observed in the tailings and the mica concentrate recovered was approximately 99% of the amount available in the feed.

It will be seen thta there is provided an inexpensive method for the separation of white mica from its ores and providing a very pure product suitable for commercial use.

I claim:

1. The method of separating white mica from its ores which comprises grinding the ore material to at least minus 20-mesh, treating the ground ore in water with from 0.1 to 1.0 pound per ton of ore of a conditioning agent consisting of quebracho extract for depressing the gangue minerals, adding to the resulting conditioned pulp mixtures from 0.05 to 1.0 pound per ton of ore of a tallow consisting of an amine having from 14 to 20 carbon atoms in the hydrocarbon chain and a frothing agent, subjecting the pulp to flotation treatment while maintaining the pH between 7.5 and 9.5 and collecting the white mica concentrate in the froth.

2. The method of separating white mica from its ores as defined in claim 1 wherein the amine is selected from the group having 16 to 18 carbon atoms in the hydrocarbon chain.

3. The method of separating white mica from its ores as defined in claim 1 wherein the frothing agent is cresylic acid.

4. The method of separating white mica from its ores as defined in claim 1 wherein the frothing agent is in the amount of 0.05 to 0.6 pounds per ton of ore.

5. The method of separating white mica from its ores as defined in claim 1 wherein the conditioning agent is tannin-bearing compound.

6. The method of separating white mica from its ores as defined in claim 1 wherein the treatment with the conditioning agent is for a period up to 10 minutes.

7. The method of separating white mica from its ores as defined in claim 1 wherein the white mica concentrate is further purified by diluting it with water, subjecting it to a further flotation treatment without adding any other reagents and collecting the cleaned froth.

8. The method of separating white mica from its ores which comprises grinding the ore material to at least 20-mesh, subjecting the ground ore to an additional separate grinding step to delaminate any mica pieces without causing any substantial reduction in the size of the other minerals, treating the ground ore in water with from 0.1 to 1.0 pound per ton of ore of a conditioning agent consisting of quebracho extract for depressing the gangue minerals, adding to the resulting conditioned pulp mixture from 0.05 to 1.0 pound per ton of ore of a tallow consisting of an amine having from 14 to 20 carbon atoms in the hydrocarbon chain and a frothing agent, subjecting the pulp to flotation treatment while maintaining the pH between 7.5 and 9.5 and collecting the white mica concentrate in the froth.

References Cited in the file of this patent

UNITED STATES PATENTS

| | | |
|---|---|---|
| 2,132,902 | Lenher | Oct. 11, 1938 |
| 2,701,057 | Clemmons | Feb. 1, 1955 |
| 2,740,522 | Aimone et al. | Apr. 3, 1956 |

OTHER REFERENCES

Taggart: Handbook of Mineral Dressing, Wiley, 1945, pages 12–34.